United States Patent [19]
Stephens

[11] 3,906,503
[45] Sept. 16, 1975

[54] INTENSITY COMPARING SYSTEM FOR DETERMINING FRACTION OF TRAVEL TIME OR DISTANCE TO A RADIATING SOURCE

[75] Inventor: Thomas C. Stephens, Cincinnati, Ohio

[73] Assignee: Rockwell International Corporation, El Segundo, Calif.

[22] Filed: Aug. 27, 1956

[21] Appl. No.: 606,947

[52] U.S. Cl. .......... 343/112 D; 102/70.2 P; 325/29; 325/310
[51] Int. Cl. ..... G01s 5/14; G01s 11/00; F42c 13/04
[58] Field of Search ................ 250/1, 27 SW, 27 F; 340/209; 343/12, 112 D, 12 MD; 325/29, 310; 102/70.2 P

[56] References Cited
UNITED STATES PATENTS

| | | | |
|---|---|---|---|
| 1,002,141 | 8/1911 | Fessenden | 343/112 D X |
| 2,206,036 | 7/1940 | Herson | 343/12 R |
| 3,020,397 | 2/1962 | Pierce et al. | 343/112 D X |

Primary Examiner—Maynard R. Wilbur
Assistant Examiner—Richard E. Berger
Attorney, Agent, or Firm—Richard W. Anderson; Robert J. Crawford

EXEMPLARY CLAIM

10. Means for indicating a positional situation for a radiation receiving means and a substantially constant average-energy radiation source moving together at a substantially-constant velocity comprising a voltage divider connected between ground and the output of said receiving means providing a proportional amplitude output, a capacitor having one end connected to ground, a switch connected serially between the other end of said capacitor and the output of said receiving means, pulser means for periodically opening and closing said switch with a closed-duty cycle that is relatively small, amplitude comparator means having a pair of inputs connected to the proportional amplitude output and the capacitor, respectively, for providing an output at a predetermined amplitude relationship between its inputs, servo means connected to the output of said comparator means, and the output of said servo means connected to the tap point of said voltage divider to adjust it.

18 Claims, 7 Drawing Figures

INVENTOR.
THOMAS C. STEPHENS

Moody and Goldman
ATTORNEYS

INVENTOR.
THOMAS C. STEPHENS
BY Moody and Goldman

INTENSITY COMPARING SYSTEM FOR DETERMINING FRACTION OF TRAVEL TIME OR DISTANCE TO A RADIATING SOURCE

This invention relates to a time determination system that uses the received amplitude of a radiation source. The invention provides a receiving system for determining the time of travel of a constant-velocity vehicle to the radiation source.

The constant velocity vehicle receives from the radiation source a signal $S$ wherein the source maintains constant amplitude $P_T$. When a square-law detector is used in the reception system of the invention, the distance $D$ between the vehicle and the radiating source varies according to the following expression:

$$S = \frac{P_T}{D^2} \qquad (1)$$

Expression (1) holds for directly received radiation where there are no substantial disturbing components, such as high intensity reflections crossing the path of vehicle travel. However, the invention does not require a square-law detector and may use any type, as long as the exponent of $D$ in expression (1) is known during the required indications of travel time. This specification will presume for purposes of explanation that a square-law detection system is used.

The invention operates best when the radiation source has constant output. However, the invention can be made to operate with little additional error when the radiation source varies either very slowly or very quickly in output amplitude with substantially constant average amplitude. Thus, little error is caused if signal $P_T$ varies only slightly during a measuring time, which is generally very short; and fast variations of signal $P_T$ can be filtered.

The particular value of source power $P_T$ is immaterial to the invention. Accordingly, the invention need not know the output amplitude of its utilized source to measure travel time or travel distance to that source.

The invention can indicate when a given amount of travel time exists before it reaches the source at a constant velocity, without knowing the value of the velocity. If the constant velocity is known, the invention can indicate its distance to the source at a given instant of time.

The time or distance indication of the invention includes a range of error that is a percentage function of the travel time or travel distance remaining to reach the radiating destination. The percentage of error can be made as small as desired, providing that the rate-of-change of the received signal is sufficient to minimize practical erros occurring from unavoidable tolerances in the component parts of an embodiment of the invention.

The invention utilizes the detected output of a radiation receiver located in a vehicle. In such case, the amplitude of the detected signal is defined by expression (1). Accordingly, the amplitude of the receiver output, $S$ will vary with time, $t$, as the vehicle travels toward the radiation source at a constant velocity, according to the following expression:

$$S = \frac{K}{t^2} \qquad (2)$$

where $K$ is a proportionality constant.

The invention includes an electrical memory device, a vibratory switch, a voltage divider, and an amplitude comparator. A simple form of memory device is a capacitor operated with a long time-constant. The vibratory switch may be either mechanical or electronic and is connected serially between the memory device and the output of the radiation receiver. The switch is periodically opened and closed by a pulser, which for example might be a free-running multivibrator. Accordingly, the memory circuit is charged in a stepped manner, wherein the amplitude of the stepped function varies periodically with the received signal.

The voltage divider in the invention is connected serially with the output of the radiation receiver. Its tap point is adjusted to provide a voltage that is defined as follows:

$$V = \frac{1}{\beta} S \qquad (3)$$

where $V$ is the signal amplitude provided at the voltage divider tap point, and $\beta$ is an important value in the invention which is further defined below.

The amplitude comparator of the invention has a pair of inputs, which are connected to the voltage-divider tap point and to the memory circuit, respectively. The comparator compares the amplitude of the continuously varying voltage at the tap point of the voltage divider with the steppedvoltage function at the output of the memory device. The amplitude comparator will indicate when a predetermined amplitude relationship (such as substantial equality) exists between its two input voltages and will give an output indication at this instant. The output may be used to operate an indicating means or a utilizing device.

The actual time of output indication, designated as time, $t_1'$, will likely have an error, because it cannot occur before theoretical travel time, $t_1$. However, it may occur after theoretical time, $t_1$, with a percentage of error that may be any amount up to the following:

$$\text{Maximum Percentage of Error} = 100 \left(1 - \frac{1}{\beta}\sqrt{\beta}\right) \qquad (4)$$

The basic quantity $\beta$ is defined as follows:

$$\beta = \frac{S_1}{S_2} = \frac{(t_2)^2}{(t_1)^2} = \frac{(t_1 + A)^2}{(t_1)^2} \qquad (5)$$

where $S_1$ is the instantaneous amplitude of the received signal at an instantaneous travel time, $t_1$, required by the vehicle to reach the radiation source. $S_2$ is the instantaneous amplitude of the received signal at another instantaneous travel time, $t_2$, that occurred one period, $A$, of vibratory switch operation before the indication time, $t_1$.

The invention can provide an output indication at approximately travel time, $t_1$. The output indication, for example, may be used to energize a light in an aircraft similar to a marker beacon light, or may be used to detonate a warhead in a missile.

The ratio $\beta$ is not dependent on the value of power output of the radiation source.

It is noted that the error is a percentage function of the theoretical-predetermined time, $t_1$; and accordingly, the error in actual time, $t_1'$, is proportionately reduced as the travel time to the radiating destination becomes smaller.

Further objects, features and advantages of this invention will be apparent to a person skilled in the art upon further study of this specification and the drawings, in which.

Figure 6:
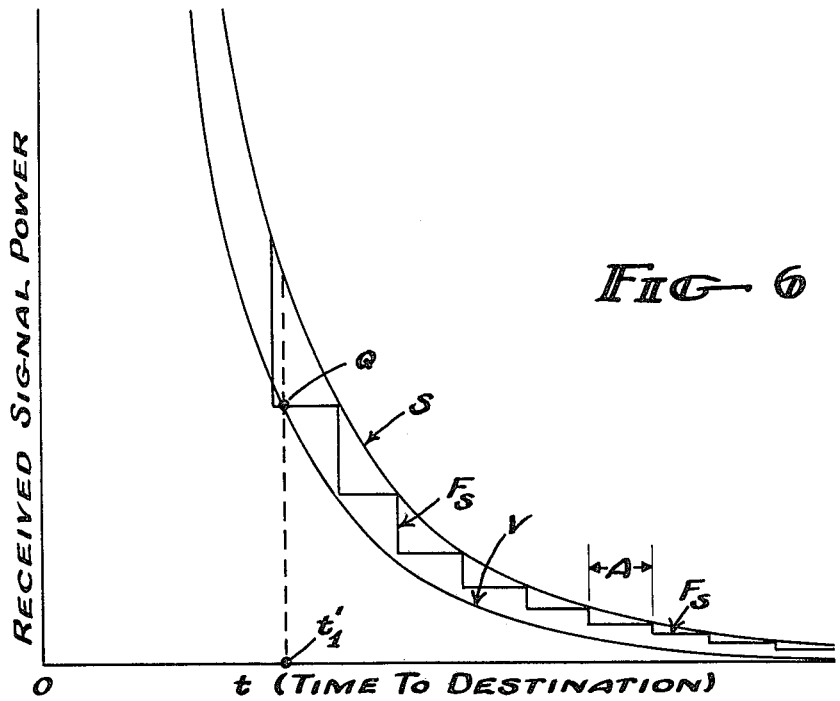
Figure 7:
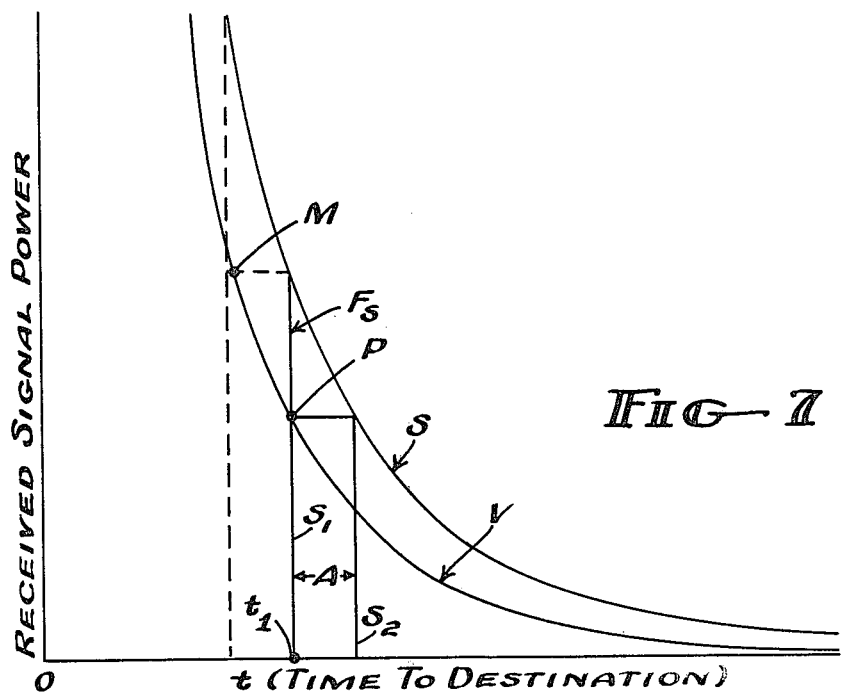

FIG. 6 provides an operational diagram; and,

FIG. 7 is an operational diagram.

Figure 1:
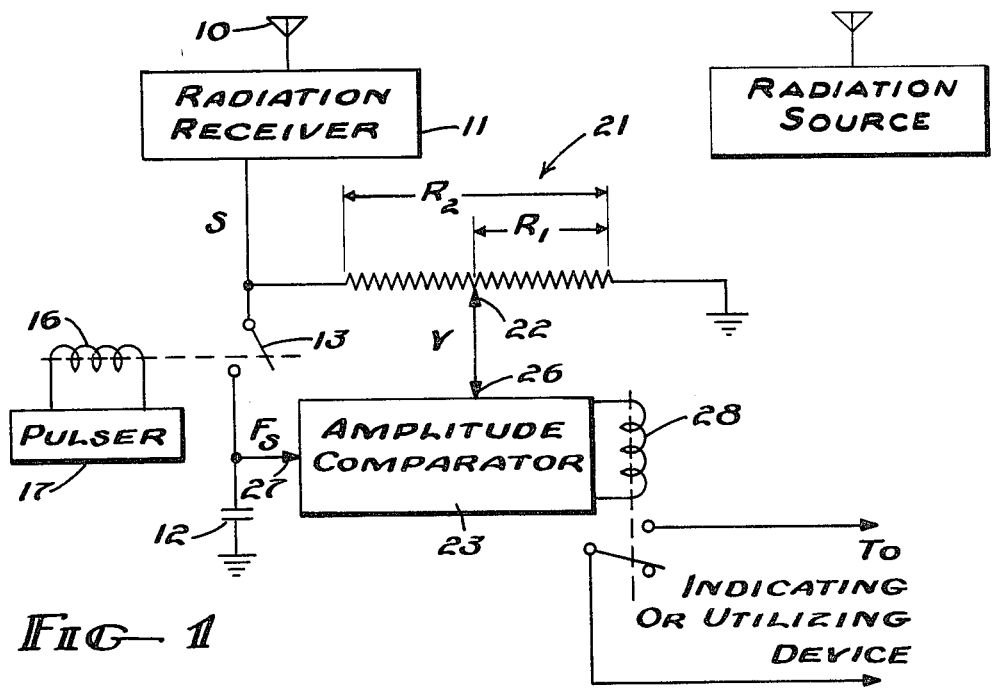
FIG. 1 shows an illustrative embodiment of the invention.

Now referring to the invention in more detail, FIG. 1 shows the basic components of the invention, which may be installed within a vehicle that is intended to move toward a signal source at a substantially constant velocity. For example, the vehicle may be an aircraft which is moving toward the radiation source. Or, on the other hand, the vehicle may be a missile which is moving toward an enemy jamming signal source.

For the purpose of the illustrative embodiment, the signal source is assumed to have a constant output amplitude, and the vehicle is assumed to be moving toward the radiation source at a constant velocity.

The vehicle has an antenna 10 to sense the source radiation. A radiation receiver 11 is connected to antenna 10 to detect the radiation and to provide a direct-current output voltage, S, that varies in amplitude inversely as the square of the distance between the vehicle and the radiation source. A capacitor 12 provides the memory device for the system, and it has one end connected to ground.

A vibratory switch 13 is connected serially between the other end of capacitor 12 and the output, S, of radiation receiver 11. Switch 13 is vibrated by a relay 16 that is actuated by the output of a pulser 17. Pulser 17 may, for example, be a free-running multivibrator preferably having a period A. It also preferably has an unbalanced duty-cycle over each period, A, wherein switch 13 is closed for only a very short portion of each cycle, which defines a "short closed duty cycle".

Thus, switch 13 preferably operates for a very small closed duty cycle.

Figure 2:
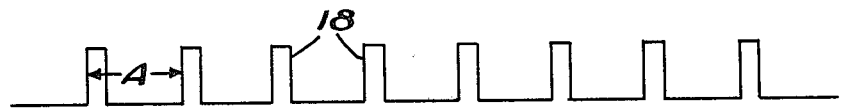
FIG. 2 illustrates the operation of a vibratory switching means utilized by the invention.

FIG. 2 illustrates an opening and closing sequence for switch 13, wherein the pulses 18 illustrate times during which switch 13 is closed, with switch 13 being open during the time between pulses 18. Pulser 17 will, therefore, have an output that corresponds to FIG. 2.

A potentiometer 21 provides the voltage divider in the system of FIG. 1. It is connected between ground and the output 14 of radiation receiver 11. The tap point 22 of potentiometer 21 is set to a particular resistance ratio $R_1/R_2$, which will be further defined below.

An amplitude comparator 23 is provided, which has one input 26 connected to tap point 22 to receive a predetermined fractional voltage, V, from the receiver output. The other input 27 of comparator 23 is connected across capacitor 12 to receive its charged voltage, which is a stepped function, $F_s$. Comparator 23 provides an output indication when its two input signals, V and $F_s$, reach a state of substantial equality.

In FIG. 1, a relay 28 is provided at the output of comparator 23, and it closes at the instant that a state of substantial equality is reached by the comparator inputs. The contacts of relay 28 are connected to a utilization device to indicate the instant of comparator input signal equality. The indicating or utilizing device may be, among many other things, a light, a buzzer, or a warhead.

Figure 3:
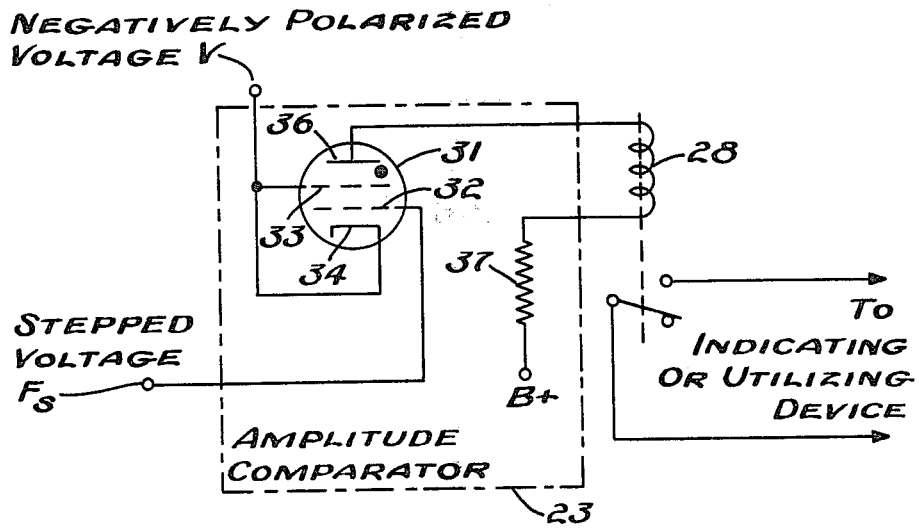
FIG. 3 illustrates one type of amplitude comparator that may be used in the invention.

There are many forms of amplitude comparators which may be used in the invention. One form is shown in FIG. 3 which includes a thyratron 31 having one grid 32, that may be connected to capacitor 12 in FIG. 1 to receive stepped voltage, $F_s$. Another grid 33 and cathode 34 of thyratron 31 are then connected to tap point 22 in FIG. 1 to receive fractional signal voltage, V. Relay 28 is connected at one end to the plate 36 of thyratron 31; and a current-limiting resistor 37 is connected between a B-plus source and the other end of relay 28.

This form of connection for thyratron 31 requires that the d.c. output, S, of radiation receiver 11 have a negative polarity. This is generally easily obtainable by controlling the connection polarity of the signal detector (not shown) in the radiation receiver. Also, this type of connection for thyratron 31 latches relay 28 upon a comparator output indication.

If the input connections to thyratron 31 are reversed, relay 28 will provide a momentary indication rather than a latched indication because the cathode of thyratron 31 would then be connected serially to capacitor 12 and current would flow through relay 28 only during the momentary period required to discharge capacitor 12.

Figure 4:
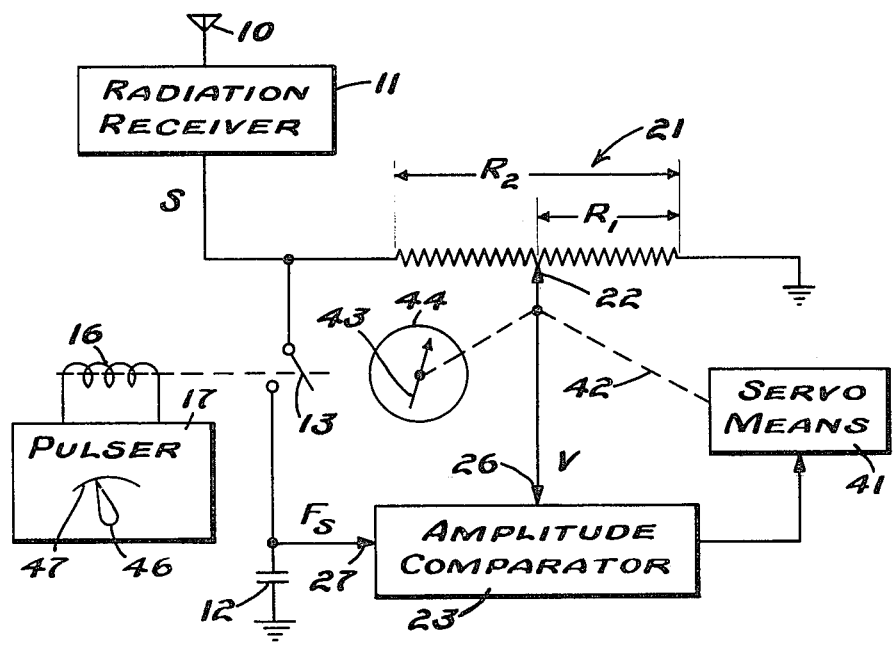
FIG. 4 shows a modified form of the invention.

FIG. 4 illustrates another form of the invention which will provide a continuous indication of the travel-time or travel-distance required to reach a radiating destination at a constant velocity. The components in FIG. 4 which are similar to the components in FIG. 1 are given the same reference numerals. In FIG. 4, there is added a servo means 41, which is connected to the output of amplitude comparator 23. The output 42 of servo means 41 is connected to the tap point 22 of potentiometer 21, and adjusts the position of tap 22 to obtain periodic equality between the inputs to the amplitude comparator.

The amplitude comparator in FIG. 4 may be similar to the type as shown in FIG. 3. Therefore, when comparator input, V, exceeds its stepped input, $F_s$, the comparator provides a d.c. output signal that drives the position of tap 22 of the potentiometer to decrease fractional voltage, V, to a smaller fractional value, so that voltage, V, moves toward the corner portion of each new higher-amplitude step of step function, $F_s$. Thus, as the vehicle moves closer to the radiation source, tap 22 is moved to the right in FIG. 4 by servo means 41, which might be a d.c. motor that is operated by the output of comparator 23.

As a result, the position of tap point 22 will be proportional to the instantaneous time, $t_1$ to the radiating destination. This is further explained below. A pointer 43, with a calibrated dial 44, is connected to tap point 22 to indicate directly the instantaneous travel time, $t_1$.

Also, in FIG. 4, pulser 17 has a knob 46 with a calibrated dial 47 to enable control of the repetition rate, and therefore, the period A, of pulser 17. Period A is preferably long while the vehicle is distant from the radiation source to provide an operable step function, $F_s$, because of practical (although not theoretical) limitations of comparator 23. On the other hand, it is preferable that period A be short when the distance is short to the radiating source. The calibration of dial 44 should reflect adjustments made in period A.

Figure 5:
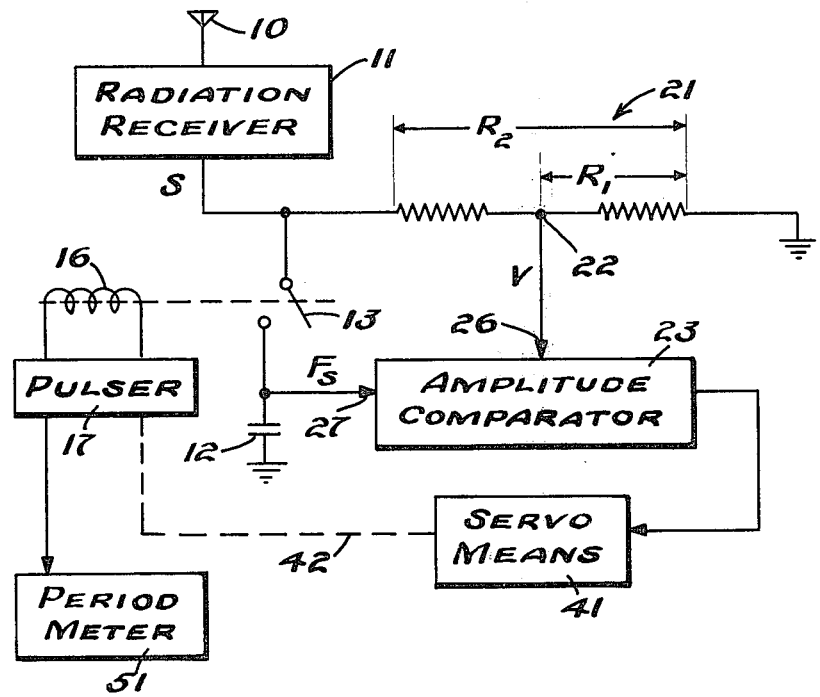
FIG. 5 shows another modified form of the invention.

FIG. 5 illustrates another modified form of the invention, which also can provide a continuous indication of travel time, but in a different manner than the form of the invention shown in FIG. 4. Like component elements in FIG. 5 have the same reference characters as in FIGS. 1 and 4.

In FIG. 5, the output 42 of servo means 41 is connected to pulser 17; and it controls the period A (repetition rate) provided by pulser 17 to relay 16. A period meter 51 is connected to pulser 17 to measure the period of its vibration. Thus, meter 51 may be a type of frequency meter.

In operation, the amplitude of the detected output, S, of receiver 11 is varied as defined by expressions (1) and (2) above.

The voltage, V, provided by tap point 22 is defined by expression (3) above and varies continuously as the vehicle approaches the radiation source. FIG. 5 shows curves illustrating voltages S and V.

On the other hand, the closing of vibratory switch 13 for very short periodic intervals charges capacitor 12 in a stepped fashion, which is represented by stepped function, $F_s$, in FIG. 6. It will be noted that the steps become steeper as time, $t$, approaches zero. As a result, the continuously-varying fractional function, V, will approach closer and closer to the corner of the stepped function, as the travel time becomes smaller. Eventually, function V, will intersect step function, $F_s$, at point Q to provide instantaneous equality of comparator input amplitudes, which causes an output actuation at point Q by comparator 23. Actuation at point Q will occur at a time $t_1'$, which will occur within the following range of time:

$$t_1' = t_1 \text{ to } t_1 \left(1 - \sqrt{\frac{1}{\beta}}\right) \quad (6)$$

It is noted from expression (6) that the absolute range of variation for the actual indicated time $t_1'$ decreases as the theoretical time, $t_1$, decreases.

The construction of a particular embodiment of the invention to provide an indication at theoretical time, $t_1$, may be done using FIG. 7 as follows: A particular value of time, $t_1$, is chosen as the maximum permissible time for a desired indication. An ordinate, $S_1$, is constructed at time, $t_1$. Then, a second ordinate, $S_2$, is constructed at a period A, equal to the time of one vibrational cycle of switch 13, to the right of ordinate $S_1$ in FIG. 7. Hence, the ratio $\beta$ is provided, which is the ratio of ordinate $S_1$ to ordinate $S_2$. The choice of period A determines the repetition rate of pulser 17.

The corner P of the portion of step function $F_s$ shown in FIG. 7 is a defining condition, wherein curve, V, (defined by expression (3) above) intersects the corner point P of this particular portion of the step function.

In an actual case, the position of the controlling period A may be displaced with respect to zero time either to the right or to the left of the defining period A in FIG. 7, because of the random starting of pulser 17 with respect to zero time. If the controlling period A is positioned by a point more to the right in FIG. 7, there will be no comparator actuation by this particular portion of the step function. Hence, it is seen that FIG. 7 shows the situation providing maximum value for any actual time $t_1'$.

On the other hand, if period A is positioned to the left in FIG. 7, the intersection of function, V, with the stepped function will be at a time $t_1'$ that is later than time $t_1$. The range of variation due to the random positions of the controlling period A is given by expression (6).

Points P and M in FIG. 7 represent the extreme variations in the actual indicated time, $t_1'$, of comparator 23; and they are the basis for the derivation of expressions (4) and (6) above.

The system of FIG. 4 operates similarly to the system of FIG. 1 except that in FIG. 4 the system continuously self-adjusts its value of $\beta$ to provide an intersection of the corner of every step of function, $F_s$. The continuous readjustment provided by servo means 41 readjusts curve V downwardly as the travel time $t$ decreases.

The setting of voltage divider 21 will be proportional to the time of travel; and accordingly, calibrated meter 43, driven by movement of tap point 22, will give a particular indication of the instantaneous remaining travel time for constant velocity movement. If the velocity is known, meter 43 may be calibrated to give an instantaneous indication of instantaneous remaining travel distance.

The position of tap point 22 on potentiometer 21 is directly proportional to $\beta$, which is defined by expression (3) above. And the instantaneous travel time $t_1$ is dependent upon $\beta$ as stated by expression (5), which may be solved for time $t_1$ to provide the following expression:

$$t_1 = \frac{A(\sqrt{\beta}+1)}{(\beta-1)} \quad (7)$$

Therefore, dial 44 may be directly calibrated in terms of travel time, since period $A$ is a known quantity in the form of the invention in FIG. 4.

It is sometimes desirable for pulser 17 to have an adjustable repetition rate where an indication is desired when the travel time is still large. In such case, signal S changes slowly, and the steps of function, $F_s$, have little variation unless period A is relatively large. A calibrated frequency adjuster 46 for pulser 17 may accordingly be provided to adjust its repetition rate in a calibrated manner. Also, the calibration of dial 44 must reflect directly the value of any chosen period A.

The system of FIG. 5 connects servo means output 42 to pulser 17 instead of to tap 22, as was done in FIG. 4. Thus, in FIG. 5, the quantity $\beta$ is fixed by a non-variable voltage divider 21.

Therefore, period A is the only quantity varied in FIG. 5. In this case, the output 44 of servo means 41 adjusts the repetition rate of pulser 17, so that the periodic corners of step function, $F_s$, substantially align with curve V which is fixed in value by the fixed value of $\beta$.

Expression (7) shows a direct relationship between period A and travel time $t_1$. Hence, meter 51 which measures the period of pulser 17 can be calibrated by direct proportionality to indicate time $t_1$. Many types of meters are known that will satisfy the requirements of meter 51. For example, a wavelength meter may be used, or a frequency meter that is calibrated in wavelength.

Consequently, in the system of FIG. 5, period A will be large when the vehicle is far from the radiation source, and it will grow proportionately smaller as the vehicle approaches the source, with the corners of all steps of function $F_s$ substantially coincide with curve V in FIG. 6.

The substantially constant velocity used with the invention refers to the closure rate between the radiation source and the radiation receiving means. Thus, both may be moving; or the source may be moving while the receiving means is fixed.

While particular forms of the invention have been described with respect to particular embodiments thereof, it is not to be so limited as changes and modifications may be made therein which are within the full intended scope of the invention as defined by the appended claims.

What we claim is:

1. Means for determining travel time between radiation receiving means and a substantially constant average-energy radiation source moving together at a substantially constant velocity, a vehicle supporting said radiation receiving means, said radiation means sensing and detecting the radiation from said source, and providing an output of proportional amplitude, voltage dividing means connected serially with the output of said receiving means, periodic sampling means connected to the output of said receiving means, storage means for retaining an electrical charge proportional to the output of said periodic sampling means, amplitude-comparison means for providing an output when its inputs have a predetermined amplitude relationship, with one input connected to said storage means, and its other input connected to an intermediate point on said voltage dividing means, with the instant of output indication of said comparator being related to the travel time of said vehicle from said source.

2. Means for indicating travel time for a vehicle travelling toward a substantially constant average-energy radiation source comprising antenna means supported by said vehicle to receive radiation from said source, receiving means connected to said antenna to detect variation in the received intensity of said radiation and providing an output of proportional amplitude, a voltage divider connected between ground and the output of said receiver, memory means for storing sampled values of said receiving means output, vibratory switching means connected serially between said memory means and the output of said radiation receiving means, amplitude-comparing means having a pair of inputs, with one input connected to said memory means, and a second input connected to the tap of said voltage divider, with said comparator providing an output when its inputs reach a predetermined amplitude relationship, wherein the period of said vibratory switch and the setting of said voltage divider determine the instant of indication of said travel time.

3. Means for indicating a predetermined travel time for radiation receiving means and a substantially constant average-energy radiation source moving together at a substantially constant velocity, with said radiation receiving means sensing received variations in said radiation from said source and providing an output of proportional amplitude, a voltage divider connected serially to the output of said radiation receiving means, memory means for sequentially remembering the values of periodically sampled voltages, switching means connected between said memory means and the output of said receiving means for periodically connecting and unconnecting the output of said receiving means to said memory means, amplitude-comparing means for providing an output indication when its inputs have a predetermined amplitude relationship, with one input being connected to said memory means, and the other input being connected across a portion of said voltage divider, wherein said comparator indication occurs at said predetermined travel time instant that is a function of said voltage divider setting and the period of said switching means.

4. Means for indicating a predetermined travel time for radiation receiving means and a substantially constant average-energy radiation source moving together at a constant velocity with said radiation receiving means detecting received variations in the radiation from said source and providing an output of proportional amplitude, a resistive voltage divider connected between ground and the output of said radiation receiving means, a capacitor having one end connected to ground, switching means connected serially between the ungrounded end of said capacitor and the output of said radiation receiving means, means for periodically opening and closing said switching means with a short closed duty cycle, amplitude-comparator means for providing an output when its inputs have a predetermined amplitude relationship, with one comparator input being connected across said charging capacitor, and the other comparator input being connected to the tap point of said voltage divider, and the setting of said voltage divider causing said comparator output to occur at a given predetermined travel time instant.

5. Means for indicating travel time for a vehicle moving towards a substantially constant average-energy radiation source at a substantially constant velocity, comprising radiation receiving means for sensing received variations in the radiation from said source and providing an output of proportional amplitude, a resistive voltage divider connected serially to the output of said radiation receiving means, an amplitude-comparator having a pair of inputs, with one input connected across a portion of said voltage divider, a capacitor, a switching means connected serially between said capacitor and the output of said radiation receiving means, means for periodically opening and closing said switching means to charge said capacitor in a stepped fashion as said receiving means moves toward said radiation source, said capacitor connected across the other input of said comparator, with said comparator providing an output at the instant of a predetermined amplitude relationship of its input signals to indicate said predetermined travel time instant.

6. Means for indicating travel time for a vehicle moving toward a substantially constant average-energy radiation source at a substantially constant velocity, comprising radiation receiving means for sensing received variations in the radiation from said source and providing an output of proportional amplitude, a potentiometer connected between the output of said receiving means and ground, a capacitor having one end connected to ground, a switch connected serially between the other end of said capacitor and the output of said receiving means, pulser means for periodically closing said switch, an amplitude comparator having one input connected across a portion of said potentiometer, and having its other input connected across said capacitor, relay means connected to the output of said comparator for being actuated at the instant said comparator input signals have a predetermined amplitude relationship, and utilizing means connected to the contacts of said relay means.

7. Means for determining travel time for radiation receiving means and a substantially constant average-energy radiation source moving together at a constant velocity, comprising voltage-divider means connected serially with the output of said radiation receiving means providing a proportional amplitude output, memory means for storing an instantaneously received signal, switching means connected serially between the output of said receiving means and said memory means, means for periodically varying said switching means between conducting and nonconducting states, amplitude-comparing means having a pair of inputs, with one input connected to said memory means, and its other input connected across a fraction of said voltage-divider means, with said comparing means providing an output when its input from said divider means exceeds its input from said memory means, servo means connected to the output of said comparing means, with the output of said servo means connected to an adjustable tap point on said voltage-divider means to adjust its position in a direction that tends to change divider means input of said comparing means to a value below the immediate value of said memory means input to said comparing means.

8. A system as defined by claim 7, including means for adjusting the period of said switching means, and means for indicating said adjustable period.

9. Means for indicating a predetermined travel time for a radiation receiving means and a substantially constant average-energy radiation source moving together at a substantially-constant velocity, comprising a potentiometer connected serially to the output of said receiving means providing a proportional amplitude output, voltage-storing means, switching means connected serially between said voltage-storing means and the output of said receiving means, means for opening and closing said switching means in a repetitious manner to charge said voltage-storing means in a stepped fashion, amplitude-comparator means having one input connected across a portion of said potentiometer, and having another input connected so said voltage storing means, with said comparator means providing an output when its potentiometer input exceeds its voltage storing means input, servo means connected to the output of said comparator means, the output of said servo means connected to the adjustable tap point of said potentiometer and moving the tap point in a direction that decreases the potentiometer input of said comparator means below its input from said storing means.

10. Means for indicating a positional situation for a radiation receiving means and a substantially constant average-energy radiation source moving together at a substantially-constant velocity comprising a voltage divider connected between ground and the output of said receiving means providing a proportional amplitude output, a capacitor having one end connected to ground, a switch connected serially between the other end of said capacitor and the output of said receiving means, pulser means for periodically opening and closing said switch with a closedduty cycle that is relatively small, amplitude comparator means having a pair of inputs connected to the proportional amplitude output and the capacitor, respectively, for providing an output at a predetermined amplitude relationship between its inputs, servo means connected to the output of said comparator means, and the output of said servo means connected to the tap point of said voltage divider to adjust it.

11. A system as defined by claim 10 which includes means for adjusting the switching rate of said pulser means in a calibrated manner.

12. A system as defined in claim 10 including travel-time indicating means coupled to the output of said servo means, said indicating means calibrated in travel-time to said radiation source.

13. A system as defined in claim 10 having a known velocity with respect to said radiating source, comprising distance indicating means coupled to the tap point of said voltage divider, with said indicating means calibrated in terms of distance to said radiation source.

14. Means for indicating a positional situation for radiation receiving means moving toward a substantially constant average-energy radiation source at a substantially-constant velocity, comprising a voltage-divider connected in series with the output of said receiving means providing a proportional amplitude output, a capacitor having one end connected to ground, a switch connected serially between the other end of said capacitor and the output of said receiving means, pulser means for periodically opening and closing said switch with a closedduty cycle that is relatively small, amplitude comparator means having a pair of inputs connected to the proportional amplitude output and the capacitor, respectively, for indicating an output with a predetermined amplitude relationship between its inputs, servo means connected to the output of said comparator means, and the output of said servo means connected to said pulser means to adjust its repetition rate.

15. A system as defined in claim 14 including means for indicating the period of vibration of said switch, with said means calibrated in travel time.

16. A system as defined in claim 14 having a known velocity, comprising period measuring means connected to said pulser means to provide an indication proportional to the period of vibration of said switch, with said period measuring means calibrated in terms of travel distance at said known velocity.

17. A system as defined in claim 1 including, a servo means connected to the output of said amplitude-comparison means, and the output of said servo means connected to said voltage dividing means to adjust its division ratio.

18. A system as defined in claim 1 including, a servo means having its input connected to the output of said amplitude-comparison means, the output of said servo means connected to said periodic sampling to adjust its sampling rate.

* * * * *